(12) United States Patent
MacKelvie (10) Patent No.: US 9,982,950 B2
(45) Date of Patent: May 29, 2018

(54) CONCENTRIC VERTICAL PIPE HEAT EXCHANGER FOR DRAIN WATER HEAT RECOVERY

(71) Applicant: Winston MacKelvie, Knowlton (CA)

(72) Inventor: Winston MacKelvie, Knowlton (CA)

( * ) Notice: Subject to any disclaimer, the term of this patent is extended or adjusted under 35 U.S.C. 154(b) by 75 days.

(21) Appl. No.: 14/757,275

(22) Filed: Dec. 11, 2015

(65) Prior Publication Data
US 2017/0167804 A1    Jun. 15, 2017

(51) Int. Cl.
*F28F 1/42*    (2006.01)
*F28F 13/12*    (2006.01)

(52) U.S. Cl.
CPC .............. *F28F 1/42* (2013.01); *F28F 13/12* (2013.01)

(58) Field of Classification Search
CPC ...... F28F 1/00; F28F 1/42; F28F 13/12; F28F 9/26; F28F 9/0234; F28F 21/085; F28F 21/062; F28F 2230/00; F28D 7/106; F28D 7/103; F28D 21/0012; F28D 7/1016
USPC .......... 165/109.1, 154, 181, 46, 761
See application file for complete search history.

(56) References Cited

U.S. PATENT DOCUMENTS

| | | | | |
|---|---|---|---|---|
| 3,127,530 A | * | 3/1964 | White ............ | F04B 53/08 165/46 |
| 3,323,586 A | * | 6/1967 | Burne ............ | F28D 7/106 165/154 |
| 4,497,365 A | * | 2/1985 | Boyer ............ | F28D 7/106 165/154 |
| 4,619,311 A | * | 10/1986 | Vasile ............ | F24D 17/0057 165/47 |
| 5,509,463 A | * | 4/1996 | Callaway, Sr. .... | F24J 3/00 165/169 |
| 8,424,296 B2 | * | 4/2013 | Burgers .......... | F01N 3/2889 165/103 |
| 2001/0004009 A1 | * | 6/2001 | MacKelvie ....... | F24D 17/0005 165/47 |
| 2002/0162650 A1 | * | 11/2002 | MacKelvie ....... | F24D 17/0005 165/154 |
| 2006/0162342 A1 | * | 7/2006 | Bhatti ............ | F25B 21/02 62/3.7 |
| 2009/0095454 A1 | * | 4/2009 | MacKelvie ....... | E03C 1/12 165/164 |
| 2009/0260586 A1 | * | 10/2009 | Geskes ............ | F02B 29/0462 123/41.48 |
| 2010/0132403 A1 | * | 6/2010 | MacKelvie ....... | E03C 1/00 62/515 |
| 2012/0279242 A1 | * | 11/2012 | Seybold .......... | F25B 40/00 62/190 |
| 2013/0306289 A1 | * | 11/2013 | McKelvie ........ | F28F 1/00 165/181 |

* cited by examiner

*Primary Examiner* — Raheena R Malik

(57) ABSTRACT

An outer plastic tube has water connections through the wall into an arcuate space defined by an O-ring spacer-gasket positioned between the wall and the perimeter margin of an inner cylinder rolled from a single-layer of sheet metal. A metal drainpipe with a removable bullet-shape at one end is forced through the cylinder to expand it and to thereby compress the gasket sealing the arcuate space. Thermal contact conductance is increased by the compressive force of water pressure. Water flow through the heat exchanger is both arcuate and turbulent to optimize heat transfer.

4 Claims, 5 Drawing Sheets

Fig 21

CONCENTRIC VERTICAL PIPE HEAT EXCHANGER FOR DRAIN WATER HEAT RECOVERY

FIELD OF THE INVENTION

This is a Continuation-in-Part of Application/Control Ser. No. 13/986,583.

The present invention is in the field of heat exchangers and more particularly for immediate heat exchange between drainwater and a second fluid, such as fresh water, where both are flowing simultaneously. In such a scenario, each fluid changes temperature where the fresh water is either heated or cooled so that if further heating or cooling is required, the heat exchanger saves energy and money. As well, the final hot or cold temperature is reached more quickly which shortens recovery time.

BACKGROUND OF THE INVENTION

Drainwater heat recovery will be the example used in the following specification.

(By way of background: measured by weight or surface area, copper sheet is less expensive than copper tube. The term 'thermal contact conductance' is used for heat transfer between solids. The rate of heat transfer between solids is a function of: thermal conductivity; contact area; contact pressure; flow rate; and temperature differential.)

Drainwater is a low-level heat source originating from sinks, showers, wash machines and toilets and the like. In addition, because it contains scum, tissues, particles, lumps, hair and the like, it cannot be stored nor can its flow be slowed. As such it requires a heat exchanger that combines low cost and high performance (for fast payback) and non-blocking (for zero maintenance).

Because drainwater must not be slowed or stopped, the exchange of heat therefore is on-the-fly and must be as fast as possible. In a vertical drainpipe, drainwater naturally flows circumferentially down the inner wall of the drainpipe as a 'falling film' which is very effective for heat exchange.

A drainpipe heat exchanger must have a relatively large bore to match plumbing code diameter requirements. Drainpipes can be huge (over 6 inch) to accommodate the entire drainwater flow in a large building such as in a hotel, or small (1 to 2 inches) for localized fixtures such as a home sink drainpipe.

Because drainwater flows non-stop, a drainpipe heat exchanger must have a high rate of heat transfer to be economical. Current drainpipe heat exchanger designs use a copper water tube spirally wound on a copper drainpipe which leaves fully 75% of the water pipe's expensive copper out of thermal contact conductance with the drainpipe. This lowers performance and makes for a long payback period.

With energy waste from drained hot water in the USA alone costing about $340 billion annually (according to the US Department of Energy), there is need for a cost effective drainpipe heat exchanger.

SUMMARY OF THE INVENTION

Although the instant invention may be used in a variety of applications, a drainpipe heat exchanger for pre-heating fresh water using heat recovered from drainwater will be described in detail herein. The heat exchanger connects between the water supply and the device using the water, such as a water heater or cooler. In all embodiments, the drainwater flows downwards through the drainpipe and the water counterflows upwards through a conduit(s). All embodiments use a minimum of heat conductive material in full thermal contact conductance.

Different embodiments of the instant drainpipe heat exchanger serve different needs. Where required by plumbing code embodiments can have double walls of separation between the drainwater and the potable water by the use of a thermally conductive inner sleeve surrounding the drainpipe. The bare drainpipe with or without a sleeve will be referred to as 'the core'. Other embodiments have only a single wall of the drainpipe between the drainwater and the fresh water. Some embodiments are fully assembled ready to plumbed in. Other embodiments are assembled on site onto an in-use drainpipe.

In all embodiments of the heat exchanger, one or more conduits for counterflowing the fresh water are created by the use of a one-piece gasket that is compressed between inner core elements and outer elements. In some embodiment, the inherent dimensions of the elements limit the gasket compression to the optimum thickness whereby the gasket also acts as a spacer. In other embodiments the gasket is compressed by tightening external clamps constricting the outer element, and therefore, to avoid over-compression of the gasket, spacer pads, rings or dimples of the correct dimension are used to limit the compression by them coming into hard contact against the core and outer element ensuring optimum compression.

In all embodiment, the longitudinal conduit for the fresh water has a generally arcuate cross-sectional shape that is not continuous but is interrupted by a gap(s). In this specification, elements having a circumference that is substantially a full circle (minus the gap) shall be called annular and elements having circumference substantially less than a full circle shall be called arcuate.

In one embodiment, a long thermally conductive inner sleeve element surrounds the drainpipe to provide double walled protection against cross-contamination. The inner sleeve is a single-walled cylinder rolled from sheet metal (e.g. copper). Its entire inner surface is in thermal contact conductance with the drainpipe and its entire outer surface (minus the minimal gasket area) is wetted by the fluid. A longitudinal gap is naturally created in forming the inner sleeve and it is left unjoined so as to allow the sleeve to constrict slightly (narrowing the gap) around the drainpipe as the considerable force from the water pressure presses the sleeve into intimate contact. In this embodiment has narrow longitudinal flanges along each side of the gap which do not contact the drainpipe.

A gasket element, preferably an O-ring, contacts the entire border periphery or margin of the inner sleeve outlining or defining an arcuate space that, when compressed, will encircle and seal the resultant arcuate conduit. For optimal performance the gasket should be only compressed to a specific amount. Straight longitudinal runs of gasket lie along the gap/flanges and hoop around the circular ends. Water pressure against the straight gasket squeezes the flanges together thereby further tightening the sleeve around the drainpipe. (Although the gasket can be custom moulded or fabricated from parts, in this specification the term 'gasket' will be used for simplicity and shall include all shapes and forms of gaskets and materials suitable for the sealing function.)

A longitudinal plastic outer sleeve or cylinder element encloses and compresses the gasket against the inner sleeve. The outer element can take several forms including: a tube; a slit-open tube (with a longitudinal gap); or segment(s) of a tube that form an arcuate or shell shape. In all cases inlet and outlet apertures, at a respective end of the outer element, enter into the conduit(s) and have plumbing fittings.

In one embodiment, the outer sleeve is a tube with internal flow compensators. The inner sleeve and the gasket are positioned within the outer sleeve and the drainpipe is pushed through. This expands the inner sleeve to an amount necessary to compress the gasket agains the inside of the tube creating the arcuate conduit. A flow redirector may be used at the inlet fitting. Of course the four elements: drainpipe, sleeve, gasket and outer sleeve must have appropriate dimensions so that the gasket will be optimally compressed.

In the slit tube embodiment, exterior band clamps constrict the tube thereby compressing the gasket onto the core to form the sealed arcuate conduit and spacers are used for optimum gasket compression.

In the shell embodiments, with their open access, the O-rings may be bonded in place before compression.

In one embodiment of the tube and slit tube embodiments, the apertures are radially spaced sets of holes, each set surrounded by cylindrical plastic manifolds with an internal circumferential groove and a water fitting. They are gasketed/sealed/bonded to the respective outside ends of the outer sleeve or cylinder. In this way water flow is distributed evenly into the arcuate conduit so as to flow across the entire inner sleeve for heat exchange with the drainpipe.

In another embodiment, instead of manifolds, there are two flow compensators inside the conduit positioned between the inlet and outlet apertures. The flow compensators can be crescent shaped or perforated washer-like rings. They can be press fitted or bonded in place. They restrict the natural tendency for flow to be the short path directly from the inlet aperture to the outlet aperture. They do this by blocking flow more adjacent the inlet and outlet apertures while blocking less farthest from the aperture, that is proportionate to the distance from the aperture. In this way, the fluid flows arcuately and evenly across the entire surface of the inner sleeve for maximum heat exchange.

Also in another embodiment there is a flow redirector at the inlet to the conduit. This is a short piece of tubing the fits inside the fluid fitting and rests on the inner sleeve. The bottom is blocked preferably with a ceramic disc to resist the erosion of the inlet water jet. Perimeter holes create multiple side jets into the conduit.

In this embodiment, the dimensions of the concentric components and the gasket diameter are chosen so that on assembly, when the drainpipe is inserted through the inner sleeve, it expands compressing the gasket the requisite about, such as by 10%, depending on the gasket material and its diameter.

In the conduit, a building's normal water pressure (or of another fluid) forces the inner sleeve tightly against the drainpipe. The pressure also thrusts the vertical runs of the gasket against the sleeve's flanges which further constricts the sleeve around the drainpipe for increased thermal contact conductance and heat transfer.

For example, given a water pressure of 50 pounds per square inch, and a nominal 3 inch by 6 foot heat exchanger of the instant design, the area in thermal contact conductance is approximately 650 square inches which results in approximately 30,000 pounds (15 tons!) of contact pressure between the inner sleeve and the drainpipe. This provides exceptionally high thermal contact conductance for fast heat exchange leading to fast payback. In regards to the gasket thrust in the above example, if compressed from 0.250 inches to about 0.2 inches a thrust of about 1,500 pounds is applied to the flanges (0.2"×12'×12"×50) which further constricts the inner sleeve around the drainpipe increasing thermal contact conductance.

BRIEF DESCRIPTION OF THE DRAWINGS

FIG. 14 shows other embodiments of the flow compensator with graduated holes on the left side where the holes are larger and/or in greater numbers away from the apertures. On the right side the same flow distribution is effected by more and/or larger notches, grooves, slots and the like;

DETAILED DESCRIPTION OF THE INVENTION

Referring to the drawings, drainpipe heat exchanger 100 has a central drainpipe 14, inner sleeve 2 with longitudinal (or vertical) extending opening or gap 7 and flanges 2a, 2b, outer cylinder 1, and continuous gasket (O-ring) 3, 3a. Preferably the drainpipe 14 is copper, the inner sleeve 2 is rolled sheet copper, and the outer cylinder 1 (a tube or cylinder) is rigid plastic such as PVC or ABS. The inner sleeve can be in a 'soft' anneal condition to allow it to conform intimately to any drainpipe surface irregularities.

In one embodiment external manifolds are used, an inlet manifold 4 (lower) and outlet manifold 4a (upper) that have inlet 5 and outlet 6 fittings. Internal circumferential flow channels 10 communicate with their respective apertures 9 which are spaced and/or sized according to their radial position: more an/or bigger holes farthest from fluid fittings, 5, 6. The inlet 5 and outlet 6 are positioned opposite gap 7.

Figure 1:
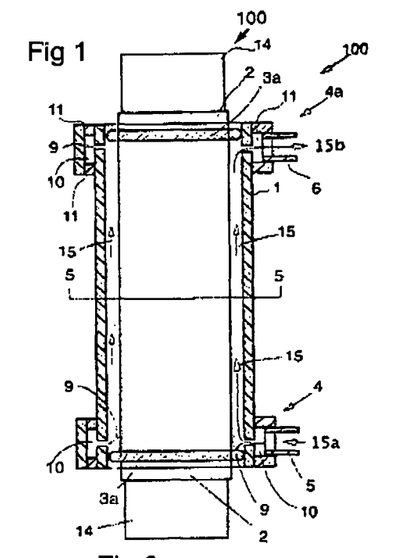
FIG. 1 is a partial cross-section side view of one embodiment of the heat exchanger with tube and external manifolds.
Figure 2:
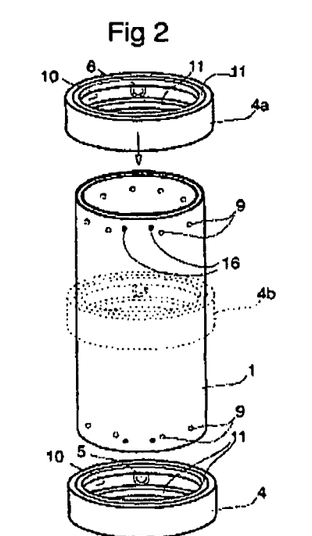
FIG. 2 is an exploded perspective of the outer cylinder, apertures, and manifolds.
Figure 3:
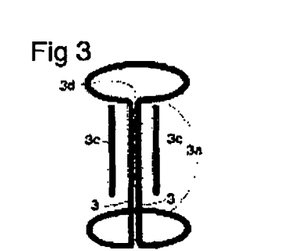
FIG. 3 shows how one gasket or gasket is re-shaped to have hoop-like ends that change to straight runs along the gap of the inner sleeve. Two gasket rods compensate for pressure.
Figure 4:
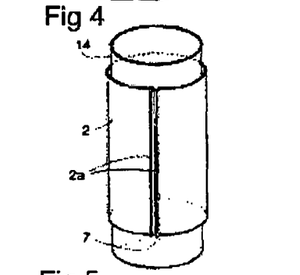
FIG. 4 shows the central drainpipe and inner sleeve with its longitudinal gap between edges of the rolled sheet copper, each with a flange.
Figures 5, 6, 7, 8:
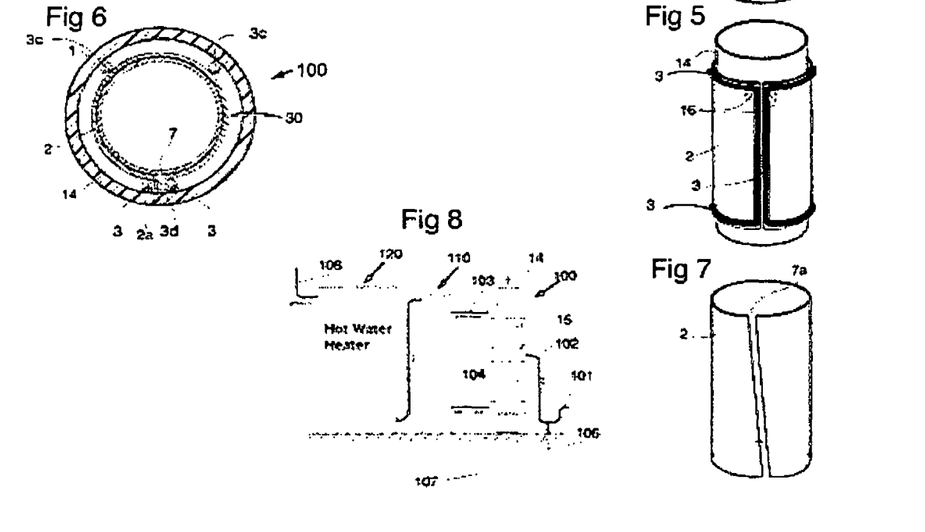
FIG. 5 shows the relationship between the drainpipe, inner sleeve and gasket and how pins can be used to hold the gasket in place during assembly.
FIG. 6 shows a cross section revealing the arcuate conduit between inner and outer sleeves spaced by the gasket.
FIG. 7 shows in perspective how the inner sleeve could be made from a trapezoidal sheet to provide an angled gap.
FIG. 8 is schematic drawing of how the instant heat exchanger, having a third centre manifold, can be used to recover heat during batch water use situations where used hot water is draining from say, a dishwasher, but no cold water is flowing to take the heat. The separate reservoir will automatically thermosiphon its water supply through the warmer heat exchanger to recover and store the heat.

FIGS. 2 and 8 show a central third manifold 4b (dashed outline) as the inlet, whereby flow in annular conduit 30 is both up and down as shown by arrows 15. However, if there is no cold water flow, but there is warm drainwater flow, then the fluid in the remote reservoir 110 and heat exchanger 100 will thermo-siphon due to a density gradient resulting from the temperature differential.

A fluid pressure regulator may be used fitted (not shown) to limit the internal pressure in conduit 30.

Figure 21:
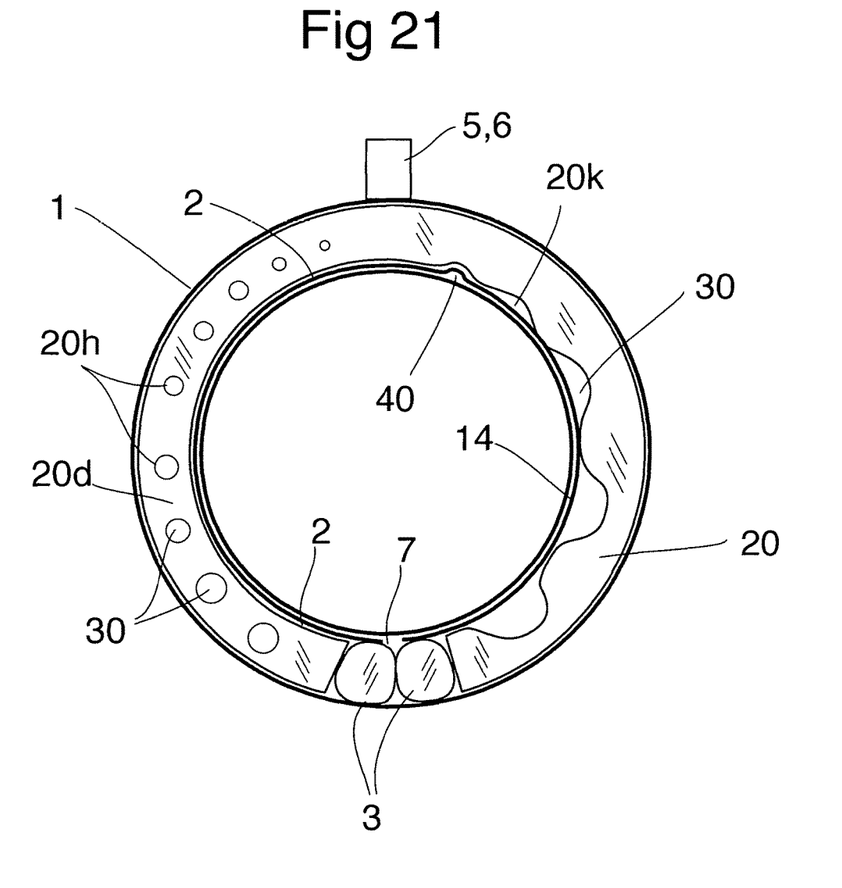
FIG. 21 shows an end view with the embossing in the sleeve for venting to the ambient.

Inner sleeve 2 is roll formed from sheet copper which leaves exposed edges that are left un-joined defining a vertically- or longitudinally extending opening or gap 7. Preferably the gap 7 has its two edges formed into flanges 2a, 2b shown in FIGS. 9, 12, 15 that, on assembly, serve to align the straight runs of gasket 3 and, when in operation, to transfer force from fluid pressure F on the O-rings (FIG. 9) to the sleeve 2 constricting it onto drainpipe 14 to increase thermal contact conductance. Gap 7 in inner sleeve 2 also serves the important function as a vent to the ambient for leak detection whereby a visible drip will develop. Inner sleeve 2 can have its inner surface engraved or etched be creased or embossed as shown in FIG. 21 as element 40 before roll forming to provide multiple small vias or passageways into the ambient again for leak detection.

Gasket 3, 3a is preferably an O-ring which contacts a marginal area around the perimeter of inner sleeve 2. Pins 16 can be added to hold sharp corners between the straight runs 3 and hoops 3a to assist assembly. The pins can also serve as compression limiters by providing solid contact between the inner and outer sleeves/shells. Opposite the straight runs of gasket 3 are two rear rods 3c of a similar material that compress on assembly of the heat exchanger to counter-act the off-centred forces of compression of the gasket 3. Dimples 1a or pads 1e can also serve to compensate for the uneven forces where dimples 1a are heat-formed or embossed in the wall of outer cylinder 1 while pads 1e are bonded to its interior. Such pads and dimples can also be designed to provide compression limits, that is, to allow compression of the gasket only to the percent of compression recommended for particular material and diameter/thickness. For assembly gasket 3 is stretched to make two parallel runs held against the inner wall of the outer cylinder by the end loops hooked together on the outside. This holds the gasket in place while the inner sleeve in inserted with the flange sliding between the straight runs.

Once assembled the sealed spacing between inner sleeve 2 and outer cylinder 1 defines the annulus conduit 30 through which flows the fluid for heat exchange. Conduit 30 may have inserts 200 to provide turbulent flow, such as mesh, rings, beads and the like. The volume of conduit 30 may depends on the gasket (gasket) diameter. Large bore tubing end welded into a ring or a shaped under the gasket will produce the same volume increase. Of course the outer cylinder would have a correspondingly larger diameter.

A larger volume would be advantageous in applications such as below a sink where a supply of hot water impractical due to plumbing or operational costs. With enough volume the instant heat exchanger can provide warm water at no cost and maintain a warm flow by using the draining used warm water to immediately heat the incoming fresh cold water.

Inner sleeve 2 may be fabricated with an angled gap 7a as shown in FIG. 7 to spread forces from gasket compression onto a larger area of the wall of the outer cylinder.

FIG. 6 shows how the components are arranged concentrically, and how pins 16 anchored in the wall of the outer cylinder engage gasket 3, 3a, where it turns sharply into the end hoop shape (the sharp corner maintains maximum surface area for heat transfer); how flange 2a fits between the gasket runs 3, and how the gasket is compressed between inner sleeve 2 and outer cylinder 1 defining the sealed annular conduit 30.

In FIG. 8 is shown how the instant heat exchanger 100 may be plumbed to include a separate reservoir 110 which is in turn, is plumbed to a water heater 120 (or a faucet, not shown) which supplies hot water via hot water branch 108. Mains water pipe 106 enters a building and splits into two branches: cold water branch 101 and hot water heater supply branch 102. All drainwater leaves via sewer connection 107. Hot water heater supply branch 102 enters the centre manifold of heat exchanger 100 and flows both up and down (dashed arrows) to exit via the two end manifolds. The end manifolds are plumbed into a raised reservoir 110, at its top 103 and bottom 104. Because hotter water is lighter or less dense that colder water, water in reservoir 110 naturally stratifies with the coldest-heaviest being at the bottom which is horizontally connected with water in heat exchanger 100. Any heat in drainpipe 14 will heat water in conduit 30 making it lighter. By natural convection it will therefore be displaced upwards by the heavier, colder water below. This thermosiphon process continues automatically as long as the water in the conduit 30 is warmer than the water at the bottom of reservoir 110, the end result being that the water in reservoir 110 becomes warmer from the top down. Reservoir 110 is plumbed to the bottom inlet of hot water heater 120 which will therefore receive that warmed water when the next demand for hot water causes cold water from mains 106 to push all the warmed water in heat exchanger 100 and reservoir 110 into water heater 120 and finally into hot water branch 108 and out any opened faucet.

Note that with this arrangement lower branch 104 can see two way flow at different times (double-ended arrows): if there is cold water flowing through supply branch 102, then flow through branch 104 (and branch 103) is to the left into reservoir 110; if only drainwater is flowing, then the flow in branch 104 will be to the right into heat exchanger 100.

Figure 9:
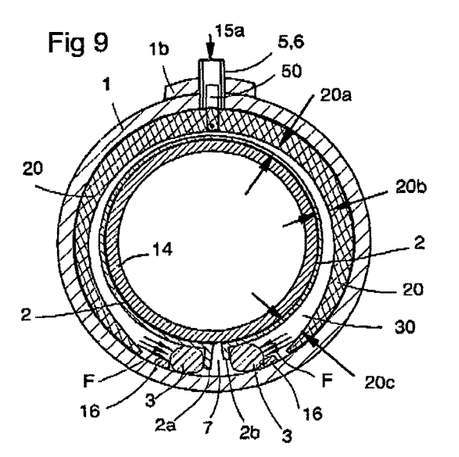
FIG. 9 is a cross section end view of an embodiment showing one of the two flow compensators bonded to the inner wall of the outer cylinder and inside the annular conduit, between the inlet and exit apertures. Also is the flow redirector in the inlet fitting, and the pins to hold the corners of the gasket.

FIG. 9 shows an embodiment of the heat exchanger with flow compensators 20 inside annular conduit 30 designed to create an even, uni-directional annular flow of fluid all along the conduit.

FIG. 9 also shows the thrust force F from water pressure urging the flanges together and tightening the inner sleeve around the drainpipe further increasing thermal contact conductance.

Figure 10:
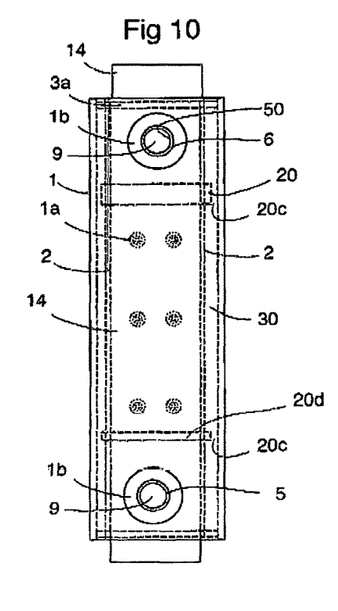
FIG. 10 is a partial cross section side view showing the apertures at the top and bottom, the flow compensators in dashed outline and the flow redirector in the inlet fitting. Also shown are moulded- and/or added dimples on the inner wall of the outer cylinder to maintain the centrality of the drainpipe and to counteract the compressive force of the long gasket runs on the opposite side.
Figure 11:
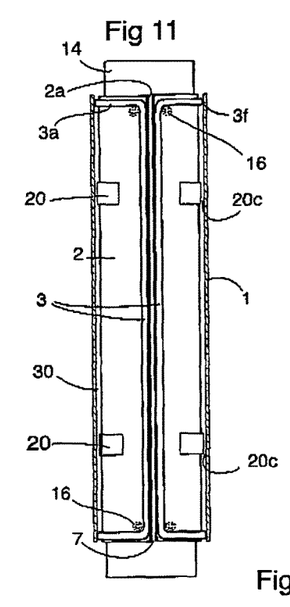
FIG. 11 shows the same embodiment from the other side where the two long runs of gasket are nested against the flanges formed on each side of the longitudinal gap of the inner sleeve. The upper and lower hoop-like portions of the gasket are also shown and the location of pins or pads projecting from the outer cylinder wall (not shown) such that a tight gasket corner can be formed and held until compressed. These can also serve as compression limiters to ensure gasket is not over compressed.

FIGS. 10 and 11 show side elevation views from opposite sides. Dimples 1a are heat-formed in the wall of the outer cylinder to counteract the force of compression of gasket 3 and to limit the compression of the gasket (or other gasket) to an ideal thickness.

Boss 1b reinforce the wall at apertures 9 where it can provide a more security for threads, bonding, or spin welding of the fluid connector 5, 6. Flange 2b is shown to be smaller (although not necessary) to allows the inner sleeve 2 to spiral down more easily into itself to become a smaller diameter for insertion through the outer cylinder during assembly.

Figure 11A:
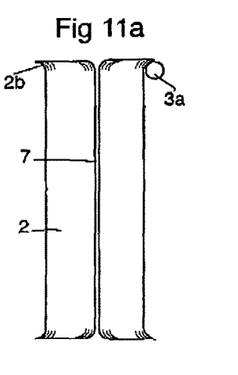
FIG. 11a shows the rims of the inner sleeve flared to provide seating for the gasket and to prevent its movement from the force of water pressure.

FIG. 11a shows how the inner sleeve 2 can have the ends flared 2b to prevent the gasket hoop 3a from moving under the force of water pressure in the conduit. One sleeve end can be pre-flared and the second flared after the second gasket hoop is in place. Of course the inner sleeve needs to start off long enough to provide for the flares 2b.

Figure 12:
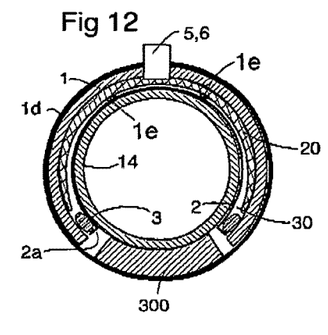
FIG. 12 shows another embodiment where the outer cylinder is a plastic tube or pipe slit-open to have a gap that can be narrowed by tightening exterior clamps. Also shown are the pins of FIG. 11 that can be formed from- or bonded to the inner wall of the outer cylinder. The inner and outer cylinder have wide gaps to enable them to be snapped over a working drainpipe (vertical or horizontal) and where an upper shoe is fitted to bridge the wide gap to preserve the exterior clamp's roundness.

The embodiment in FIG. 12 can be fitted over a working drainpipe (vertical or horizontal). Here the gaps in the inner and outer sleeves are wide enough to enable the sleeves to spread apart and snap over the drainpipe. A shoe 300 is fitted to bridge the wide gap to preserve the roundness of exterior clamp 1d.

Figure 13:
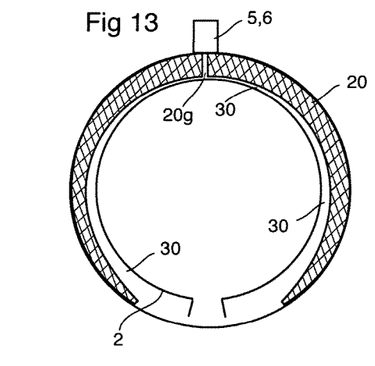
FIG. 13 shows a simplified view of the flow compensator bonded to the interior of the outer cylinder. The drainpipe and outer cylinder wall are not shown. The flow compensator tapers from thick adjacent the aperture to thin towards the radially distant limits of the arcuate conduit. Also shown is how it may be made in two identical halves.
Figure 14:
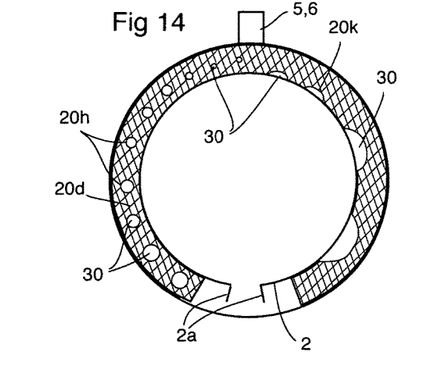

FIGS. 13 and 14 show 'stripped down' end views to more clearly show the flow compensator 20 fitted inside the annular conduit, one at each end between the apertures 9 to spread and even-out the fluid flow from an inlet jet into a uni-directional arcuate flow between apertures. In one embodiment it has an arcuate shape (bowed or arch-like) with an outer radius to match that of the inner wall of the outer sleeve or shell and an inner radius suited to the conduit's dimensions and flow capacity and that accurately proportions the flow area from centre (flow space 20a) outwards on both sides (flow spaces 20b, 20c), or, said otherwise, to block the conduit more centrally adjacent the inlet and progressively less on both sides of centre. The area blocked varies in proportion to the distance from the inlet to compensate for the fact that there is higher fluid pressure at the central inlet aperture with progressively less further around the annulus conduit. There can be more than two flow compensators to maintain the desired annular flow especially on long heat exchangers. They can be made of metal or plastic rods, tubes or sheet, by cutting, forming, or moulding. They can be force-fitted, adhesively bonded, cemented, mechanically secured. The outer cylinder can be heat softened and have a flow compensator 20c embossed into the wall to intrude into the conduit 30. Flow compensators 20 can be tapered, have holes, notches, slots, gashes, folds, twists, or multiple 'fence' parts such as pins, pads, buttons, fins, and the like, so long as they spread and even-out the fluid into a annular flow.

FIG. 14 shows how the flow compensator 20 can use a variety of features. On the left side is shown how holes 20h can vary in diameter and/or in density around a plain washer-like open torus. On the right side notches 20k have the same effect as would other shapes such as twisted slits or slots. Flow compensator 20 can be made in two mirrored halves leaving a gap 20g for flow if a tight fit in the conduit is desired. Flow compensator 20 can be made of thermally conductive material such as copper and be in contact with the inner sleeve to act as a fin to speed heat transfer.

Figure 15:
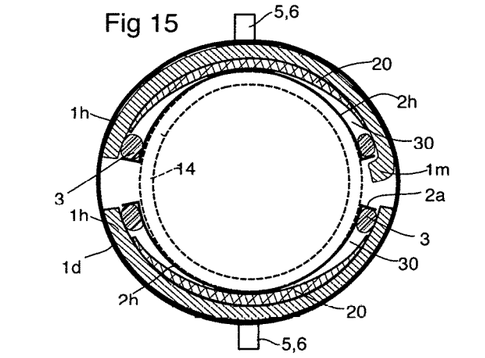
FIG. 15 shows a heat exchanger embodiment in two longitudinal halves assembled on a single drainpipe. Each half has an inner shell, fittings, flow compensators, a gasket, a flow redirector and a outer shell, and external clamps. The clamps urge the outer shells against their respective O-rings which compress onto the inner shells making two arcuate conduits. Also shown is how the edges of the outer shell can have abutments for the O-rings to nest against.

FIG. 15 shows an end view of an embodiment of the heat exchanger made in two mirrored halves. The outer shells can have abutments 1m (only one shown) along the gaps for the straight runs of O-rings 3 to nest against which can eliminate the need for flanges 2a on inner shells. Abutments 1m can also be formed on the ends (not shown) to retain the gasket hoops 3a. Abutments 1m can be formed by heating to soften the plastic which can then be moulded as needed. The embodiment can be installed onto a working drainpipe 14 without disruption of service. Multiple outer band clamps 1d compress the O-rings between the outer half shells 1h and the inner half shells 2h. The upper and lower fluid inlet and outlet apertures are four in total. Flow compensators 20, turbulators 200, and flow redirectors 50 are included in each half. The embodiment has application in horizontal installations.

Figure 16:
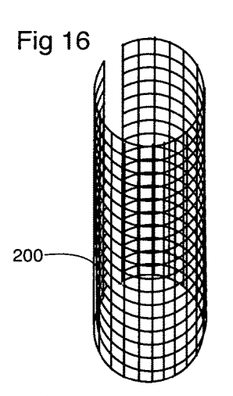
FIG. 16 is a perspective of a longitudinal turbulizer that installs inside the arcuate conduit. It is depicted as mesh-like; and with the near end having a ring for the gasket hoop corners.

FIG. 16 shows a perspective representation of an annular turbulator 200 that causes turbulence in the water the length of the conduit to dislodge the natural-forming laminar and boundary layers of fluid that impede heat transfer. The turbulator 200 is depicted in mesh form to represent a discontinuous annular surface including but not limited to: perforated sheet, tabbed sheet, wire forms, screen, coils, twisted strips, chain, string beads. A tabbed sheet offers the advantage where each tab is oriented to deflect the fluid angularly downwards so as to directly impinge against the core for maximum effect. If in a compatible metal, the tabs can touch the core and thereby act as fins to increase heat transfer.

Figure 17:
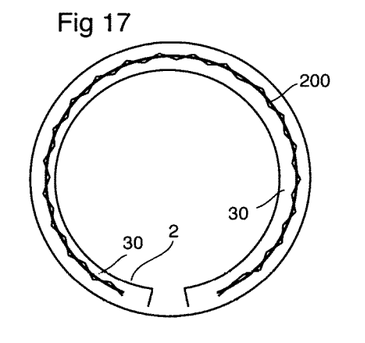
FIG. 17 shows a simplified end view of how the turbulizer can be centrally located in the conduit.

FIG. 17 shows how the turbulator 200 fits within the conduit. The flow should vortex through the turbulator to maintain homogeneous in temperature along the length. Bending the corners into point contact (not shown) can serve to hold it on centre. It can be added over the inner sleeve before assembly or slid into the conduit before final closure. The turbulator can also double as a support, in place of pins 16, for the gasket 3 where it curves into hoops 3a.

Figure 18:
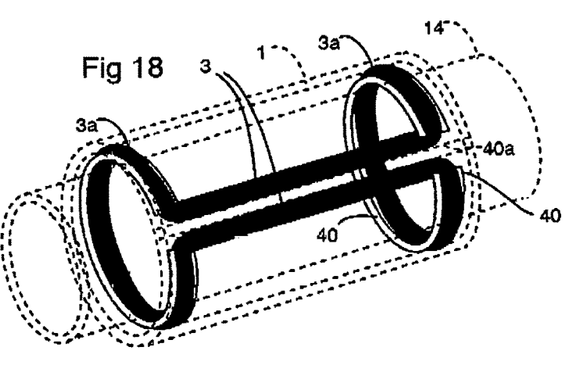
FIG. 18 shows a phantom perspective of an embodiment with a slit-open tube for the outer cylinder and with no inner sleeve. The straight gasket runs are spaced further apart to allow the gap in the outer cylinder to overlap them to make assembly easier.

FIG. 18 shows a phantom perspective of the embodiment with no inner sleeve and where the outer cylinder is a segmented tube that results in a substantial gap 40a which closes somewhat when external clamps 1d are tightened. It shows how the gasket can be held in place using tight fitting rings 40 on the inner sleeve and how they hold the corner where the gasket changes direction from a straight run 3 to the hoop end 3a until compressed in place. Inner rings 40 are left in place and are preferably copper wire. The rings can have a diameter that limits gasket compression to an ideal amount. The outer rings 40 can be removed after assembly.

Figure 19:
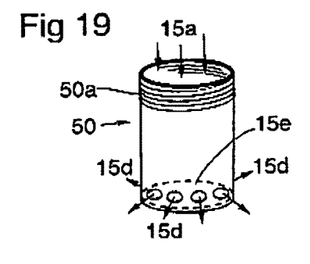
FIG. 19 is a perspective of the flow redirector showing it to be a closed end tube with radial holes above a bottom insert to resist erosion.

FIG. 19 shows the flow redirector 50 in perspective. The inner end of a short tube of metal or plastic that is closed and/or blocked by disc 15e and has multiple side openings 15d to resist the erosive effects of microscopic mineral particles in water from the inlet water jet. Flow redirector 50 installs upstream of inlet flow compensator 20 where it redirects inlet flow 15a at a right angle and splits it into multiple radial jets 15f. The disc 15e is preferably plastic, ceramic or other hard, rust-proof material. Flow redirector 50 can include the fluid connection requirements such as having threads 50a none or both ends. Other functionally equivalent features such a shoulder on the internal end (not shown) for spin welding to boss 1b and grooving on the external end to receive clamp-on water lines can be incorporated.

Figure 20:
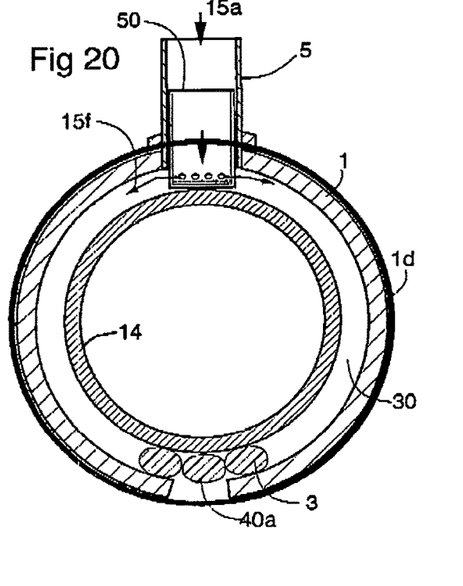
FIG. 20 shows an end view with the flow redirector redirecting the main inlet flow at right angles into multiple side jets. Also shown is how the gasket straight runs can be bonded to a rod to assist assembly.

FIG. 20 shows an end view of heat exchanger 100 with flow redirector 50 as a separate element concentrically installed inside inlet fitting 5 which may be oversized to compensate for the reduction in cross section flow area that results. Flow redirector 50 is shown with jets of water 15f emanating radially at right angles to the inlet flow direction.

Although the invention has been shown and described with respect to detailed embodiments thereof, it should be understood by those skilled in the art that various changes in form and detail thereof may be made without departing from the spirit and the scope of the claimed invention.

I claim:

1. A heat exchanger for first and second fluids comprising:
    a tubular housing having a continuous wall with an interior surface, circumferential margins at each end, a linear path between the margins, and at least two orifices between the margins;
    a flexible compressible gasket having two straight central portions and two circular end portions; and where the straight portions contact the path and the circular end portions contact the circumferential margins;
    a thermally conductive sleeve having a longitudinal gap and an exterior perimeter margin contacting the gasket;
    a thermally conductive drainpipe having end portions extending from the housing for connection into a supply of the first fluid; and where
    the drainpipe is forced through the sleeve to expand the sleeve, compress the gasket, and thereby create a sealed arcuate conduit with orifices for the second fluid to flow through the conduit and exchange heat with the first fluid in the drainpipe.

2. The heat exchanger of claim 1 where the conduit has at least one flow compensator therein and perpendicular to the flow therethrough; and where the compensator has at least one feature designed to create arcuate flow in the second fluid.

3. An assembly for attachment to an existing in-use drainpipe through which a first fluid flows, the assembly comprising:
    a thermally conductive arcuate sleeve designed to thermally contact at least a portion of a drainpipe;
    the sleeve having an exterior surface with a perimeter margin;
    a compressible gasket contacting the perimeter margin of the sleeve;
    an arcuate outer housing having an interior perimeter margin contacting the gasket;
    the housing having at least one inlet orifice and at least one outlet orifice located within the interior perimeter margin;
    the at least one inlet orifice connected to a supply of a second fluid at a first temperature and the at least one outlet orifice connected to an appliance that uses the second fluid at a second temperature;
    at least one clamp exterior to the housing to urge the assembly onto a drainpipe and thereby compress the gasket to seal the conduit and thereby create a heat exchanger for the first and second fluids.

4. The assembly of claim 3 and a second assembly of claim 3 both clamped onto a drainpipe.

* * * * *